US005517388A

United States Patent [19]
Hutchisson

[11] Patent Number: 5,517,388
[45] Date of Patent: May 14, 1996

[54] ROTATING LIGHT BEACON INCLUDING LOW-PROFILE STEPPER MOTOR

[75] Inventor: James T. Hutchisson, Bellevue, Wash.

[73] Assignee: Dominion Automotive Group, Inc., Uxbridge, Canada

[21] Appl. No.: 379,256

[22] Filed: Jan. 26, 1995

[51] Int. Cl.[6] .................................................. F21V 21/30
[52] U.S. Cl. .......................... 362/35; 362/284; 362/324; 362/386
[58] Field of Search ................................. 340/471, 472, 340/473, 815.77; 362/35, 271, 272, 284, 324, 386

[56] References Cited

U.S. PATENT DOCUMENTS

| | | | |
|---|---|---|---|
| 2,578,239 | 12/1951 | Gosswiller | 177/329 |
| 2,740,103 | 3/1956 | Gosswiller | 340/50 |
| 3,117,302 | 1/1964 | Cardarelli et al. | 340/50 |
| 3,781,538 | 12/1973 | Brudy et al. | 240/49 |
| 4,205,366 | 5/1980 | Bleiweiss et al. | 362/35 |
| 4,231,078 | 10/1980 | Hitora | 362/35 |
| 4,320,385 | 3/1982 | Bleiweiss et al. | 340/133 |
| 4,387,362 | 6/1983 | Gosswiller | 340/81 R |
| 4,701,743 | 10/1987 | Pearlman et al. | 340/84 |
| 4,931,768 | 6/1990 | Jincks et al. | 340/473 |
| 4,970,627 | 11/1990 | Beaumont et al. | 362/35 |
| 5,003,444 | 3/1991 | Secka et al. | 362/277 |
| 5,057,985 | 10/1991 | Kreutzer, Jr. et al. | 362/425 |
| 5,091,828 | 2/1992 | Jincks et al. | 362/35 |
| 5,097,397 | 3/1992 | Stanuch et al. | 362/324 X |
| 5,207,496 | 5/1993 | Stanuch et al. | 362/35 |

*Primary Examiner*—Stephen F. Husar
*Attorney, Agent, or Firm*—Christensen, O'Connor, Johnson & Kindness

[57] ABSTRACT

A parabolic reflector (14) is rotated about a stationary light source (12) to create a beacon. A low profile stepper motor (30) includes a centrally located spindle (34) having a socket (35) in which the light source (12) is placed. A hub (50) fits over the spindle (34). The hub (50) includes a slot (57) that receives a corresponding tab (16) on the parabolic reflector so that, as the low profile stepper motor (30) rotates, the parabolic reflector (14) is rotated about the light source (12).

5 Claims, 3 Drawing Sheets

ROTATING LIGHT BEACON INCLUDING LOW-PROFILE STEPPER MOTOR

FIELD OF THE INVENTION

The present invention relates to emergency vehicle lights, and in particular to rotating light beacons.

BACKGROUND OF THE INVENTION

Rotating light beacons are used on many types of emergency vehicles including police cars, ambulances, fire trucks, as well as service vehicles such as tow trucks, etc., to draw attention to the vehicle. A typical rotating light beacon includes a colored transparent cover, centrally located halogen or other high-power bulb, a reflector, a motor, and a gear mechanism that rotates the reflector about the centrally located bulb.

The motor and gear mechanism found in conventional rotating light beacons are the sources of several problems. First, the gear and motor mechanism are a common source of beacon failure. Secondly, the brushes of the motor produce radio frequency interference when the beacon is operating. Finally, the space taken up by the motor and gear adds to the overall height of the beacon, thereby increasing the wind resistance and, as a result, increasing the fuel consumption of the vehicle on which the rotating light beacon is mounted. Therefore, there is a need for a rotating light beacon that eliminates the need for a motor and gear mechanism to rotate the reflector. The beacon should be inexpensive to manufacture and rugged enough to endure the vibrations encountered on a moving vehicle without damage.

SUMMARY OF THE INVENTION

To solve the problems associated with the motor and gear mechanism in prior art light beacons, the present invention provides a rotating light beacon that includes a stationary light source, a parabolic reflector, and a pancake-style stepper motor that rotates the parabolic reflector about the stationary light source.

The stepper motor includes a base having a centrally located spindle. In the center of the spindle is a socket designed to receive the light source. A hub fits over the spindle and rests on a shoulder on the spindle such that the hub can rotate freely about the spindle. The hub further includes a slot that receives a corresponding tab on the parabolic reflector in order to secure the parabolic reflector to the hub. An annular magnet having a plurality of alternately polarized sections is secured over the hub. A plurality of actuator coils are disposed in close proximal relationship to the annular magnet. A drive circuit produces alternating magnetic fields that cause the annular magnet to rotate. Movement of the annular magnet rotates the parabolic reflector around the light source.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
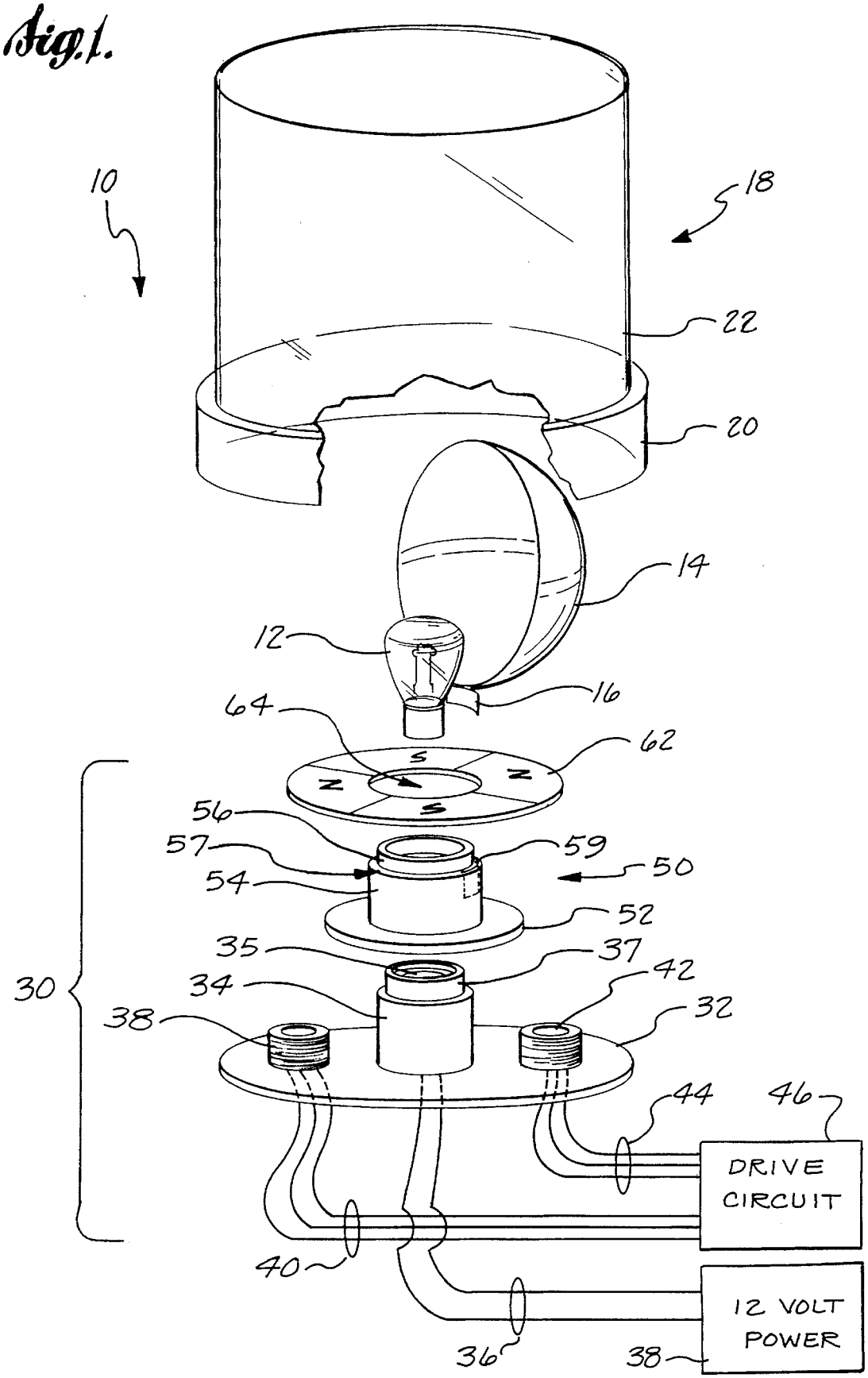
FIG. 1 is a top isometric of a rotating light beacon according to the present invention, with parts shown in exploded relationship.

With reference to FIG. 1, a rotating light beacon 10 according to the present invention includes a stationary light source 12 that preferably comprises a 12-volt halogen light bulb. A parabolic reflector 14 rotates around the light source to create a moving concentrated beam of light. The rotating light beacon 30 includes a cover 18 having an opaque base 20 and a transparent dome 22 that is secured to the base. The dome is preferably colored, usually red, yellow or blue, and may include a built-in lens that further concentrates the light beam emanating from the light source 12 and reflector 14.

As indicated above, prior art light beacons have used a motor and corresponding gear mechanism to rotate a reflector about a light source. However, the present invention eliminates the need for a gear mechanism through the use of a low profile or "pancake-style" stepper motor 30. The stepper motor 30 includes a base 32 having a central upright spindle 34. At the center of the spindle 34 is an electrical socket 35 for receiving the light source 12. Wires 36 convey energy from a power source 38 to the socket. The power source can be the 12-volt power supply of the vehicle on which the rotating light beacon 10 is disposed.

The spindle 34 has a larger outer diameter at its lower portion than at its upper end portion, thereby forming a peripheral shoulder or lip 37. The shoulder 37 is preferably located approximately at two-thirds of the height of the spindle.

Also secured to the base 32 are a pair of actuator coils 38 and 42 that produce varying electromagnetic fields that rotate the stepper motor as will be described. The actuator coils 38 and 42 are preferably located 180° apart on the base 32. Although two actuator coils are used in the preferred embodiment of the present invention, it is possible that an additional number of coils could be used, if desired, spaced equiangularly around the spindle. Extending from the actuator coil 38 is a set of leads 40 that conducts electric current from a drive circuit 46. Similarly, a set of leads 44 is connected to the actuator coil 42 to conduct electric current from the drive circuit 46.

A hub 50 fits over the spindle 34. Such a hub has a lower, horizontally extending flange 52, a middle section 54 and a top section 56. The middle section 54 has an inner diameter that is large enough to receive the widest portion of the spindle 34. Similarly, the top section 56 of the hub has an inner diameter that is slightly larger than the outer diameter of the top portion of the hub 34. An annular lip 57 is formed where the middle section 54 joins the top section 56. The lip 57 rests on the corresponding shoulder portion 37 of the spindle. The top of the hub is open so that the light source 12 can extend through the hub and into the electrical socket 35 within the center of spindle 34. The hub 50 also includes an arcuate slot 59 that is cut into the shoulder portion 57 and extends parallel to the longitudinal axis of the hub. The slot 59 receives a corresponding arcuate tab 16 on the base of the parabolic reflector in order to secure the parabolic reflector to the hub 50.

A thin annular permanent magnet 62 has a hole 64 in the center that is large enough to fit over the middle section 54 of the hub 50. The annular magnet 62 has a plurality of alternately polarized sections that are either attracted or repelled by the magnetic fields produced by the actuator coils 38 and 42 described above. The annular magnet 62 is secured to the hub 50 by a suitable adhesive such that the inner margin of the magnet lies in contact with the horizontally extending flange 52 at a position just above the tops of the actuator coils. Preferably, the annular magnet is made of a sintered neodymium-iron-boron material, with four 90° alternately polarized sections. Magnets of this type may be purchased from Dexter, Magnetic Materials of Sunnyvale, Calif.

Figure 2:
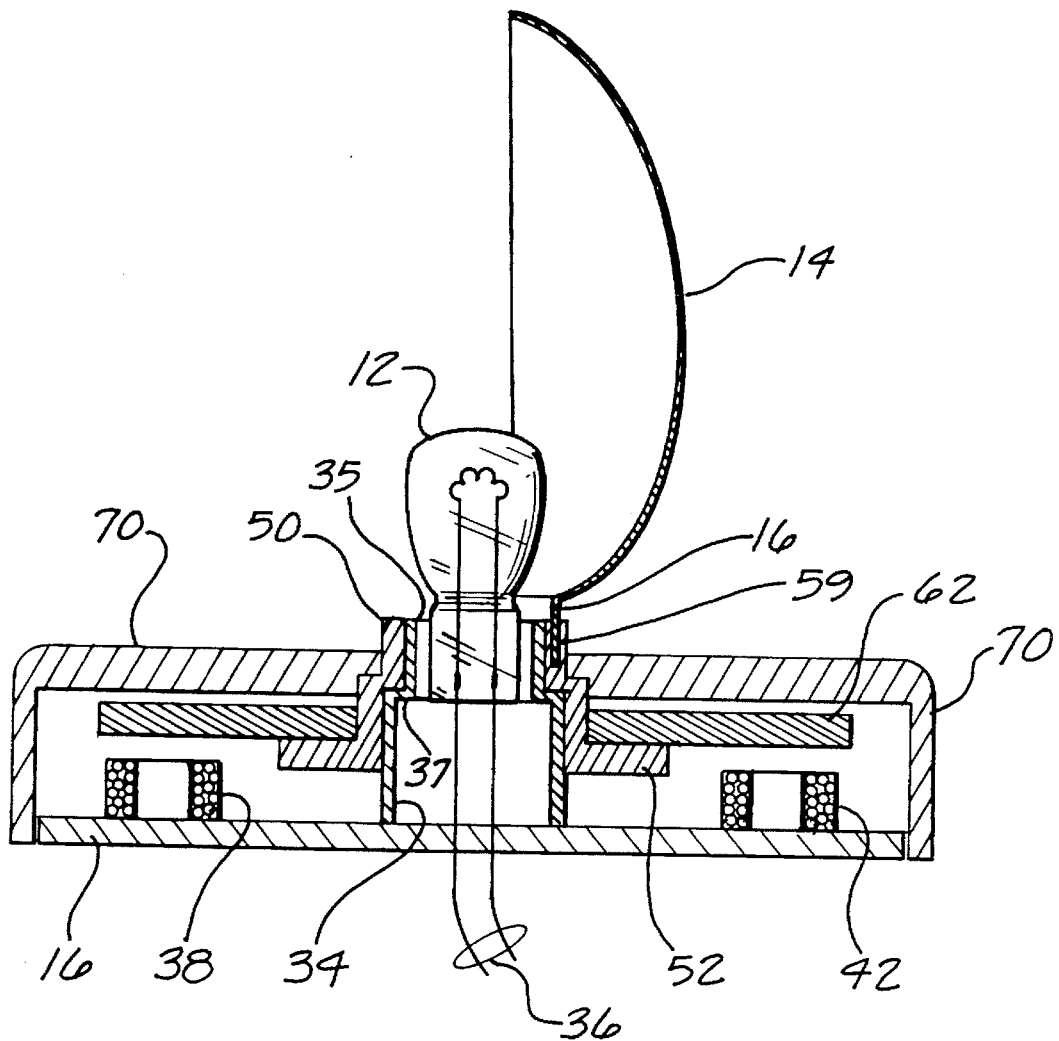
FIG. 2 is a partial vertical section of the rotating light beacon according to the present invention, with parts assembled.

FIG. 2 is a cross-sectional view of the low profile stepper motor 30, the light source 12 and the parabolic reflector 14. As can be seen, the annular magnet 62 is supported by the horizontally extending flange 52 of the hub 50. The flange 52 supports the magnet 62 just above the pair of actuator coils 38 and 42. As will be described, the actuator coils 38 and 42 are energized to rotate the magnet 62 and the parabolic reflector around the light source 12. As indicated above, the arcuate tab 16 of the reflector is inserted into the slot 59 of the hub 50. Surrounding the stepper motor 30 is a cover 70 that prevents the hub 50 from moving off the spindle 34.

Figure 3:
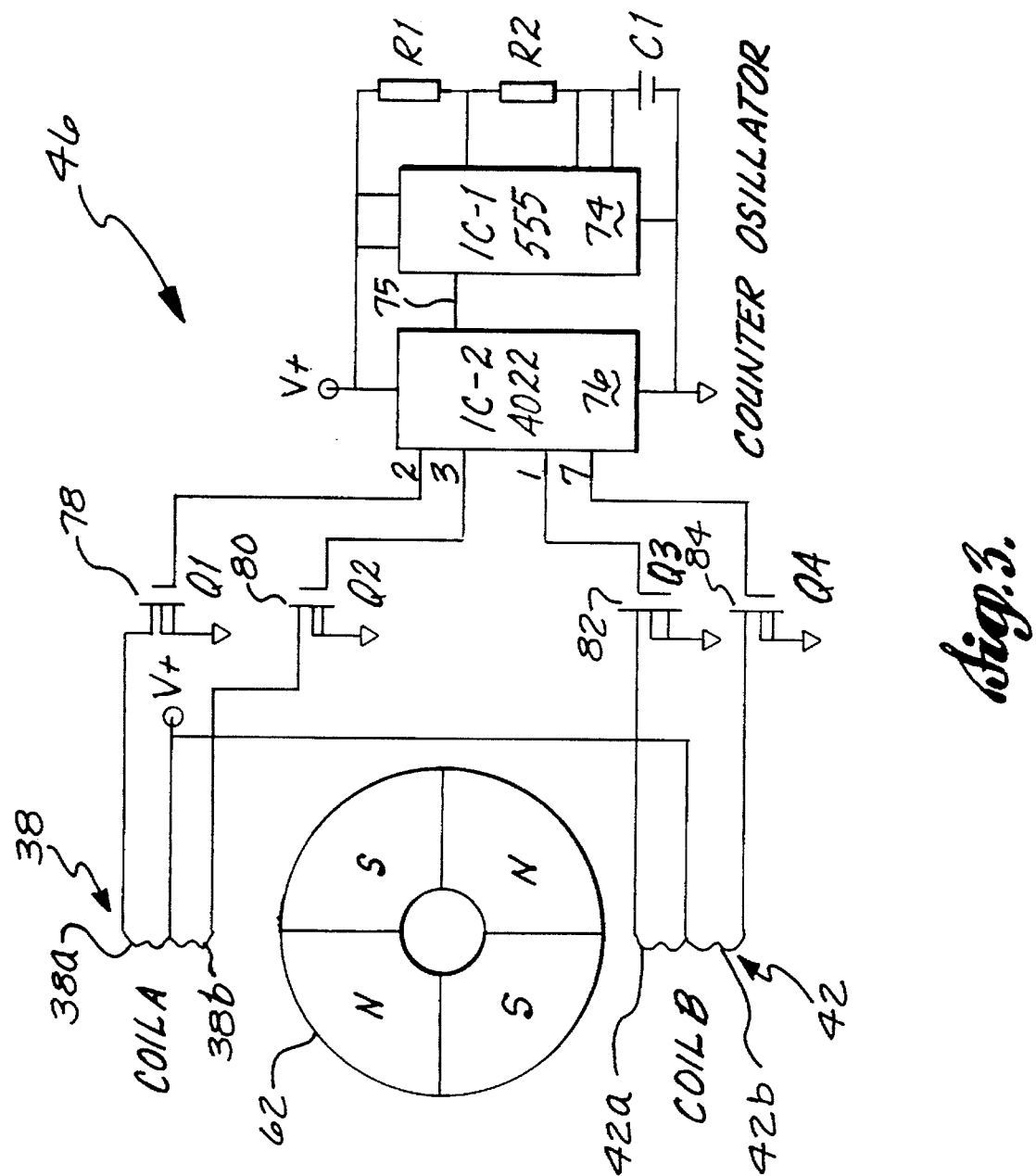
FIG. 3 is an electronic block diagram of a stepper motor drive circuit used in the beacon of the present invention.

Turning now to FIG. 3, the preferred drive circuitry 46 includes a timer circuit 74, a counter circuit 76, and four transistors 78, 80, 82 and 84. The timer circuit 74 is preferably a 555 timer circuit producing a steady stream of output pulses on an output pin 75. The frequency of the output pulses is controlled by a pair of resistors R1, R2, and a capacitor C1. In the preferred embodiment of the present invention, the frequency of the output pulses is selected to be 100–1000 Hz.

The counter circuit 76 is preferably a conventional 4022 Johnson decoder circuit that produces a signal on eight output leads. However, only four output leads are used in the present invention. Specifically, the output on pin 2 is connected to a gate electrode of transistor 78, the output on pin 3 is connected to a gate electrode of transistor 80, the output on pin 1 is connected to a gate electrode of transistor 82, and the output on pin 7 is connected to a gate electrode of transistor 84.

The actuator coil 38 is driven by the two transistors 78 and 80. The actuator coil 38 is bifilar with two coils 38A and 38B being wound in opposite directions to produce magnetic fields that can extend in either direction through the center of the actuator coil 38. Each of the coils 38A and 38B connect at a common point at which a voltage source +V is supplied. The voltage source is preferably obtained from the automobile's 12-volt battery. The transistor 78 is connected to the coil 38 such that when the transistor is energized, electric current is conducted through the coil 38A, and a magnetic field extending through the center of the coil is produced. Similarly, transistor 80 is connected so that when energized, electric current is conducted through the coil 38B and a magnetic field extending in the opposite direction is produced through the center of the coil 38.

The actuator coil 42 is similarly constructed of two coils 42A and 42B wound in opposite directions to produce a magnetic field in either direction through the center of the actuator coil 42. The transistor 82 is connected to conduct electric current through the coil 42A when energized. Similarly, the transistor 84 allows electric current to flow through the coil 42B when energized. When the actuator coils 38 and 42 are alternately energized, alternately polarized sections of the annular magnet 62 are attracted and repelled by the magnetic field, thereby causing the parabolic reflector 14 to rotate about the centrally located light source 12 shown in FIGS. 1 and 2.

The benefit of the low profile stepper motor is that it eliminates the need for a conventional motor, as well as a set of gears to rotate the parabolic reflector. The use of the low profile stepper motor reduces the overall height of the light beacon thereby increasing fuel efficiency of the vehicle on which the light beacon 10 is placed. Additionally, the stepper motor 30 produces less electromagnetic interference than conventional brush-type electric motors found in prior art rotating light beacons.

Although the present invention has been disclosed with respect to its preferred embodiment, those skilled in the art will recognize that changes could be made without departing from the spirit and scope of the invention. For example, although the present invention has been disclosed using two actuator coils, those skilled in the art will recognize that additional actuator coils can be utilized if necessary. The stepper motor 30 could contain four or eight actuator coils, provided the annular magnet is fashioned with eight or sixteen alternately polarized magnetic sections. Therefore, the scope of the invention is to be determined solely from the following claims.

The embodiments of the invention in which an exclusive property or privilege is claimed are defined as follows:

1. A rotating light beacon, comprising:
   a light source;
   a stepper motor including:
   a base;
   a spindle extending from the base;
   an electrical socket disposed in the spindle, the electrical socket receiving the light source;
   a hub rotatably secured to the spindle;
   a permanent magnet having a plurality of alternately polarized sections, said permanent magnet being disposed on the hub for rotation therewith;
   a plurality of actuator coils disposed proximally to the permanent magnet;
   a reflector coupled to the stepper motor; and
   a stepper motor drive circuit for energizing the plurality of actuator coils to create magnetic fields that attract and repel the alternately polarized sections of the permanent magnet to rotate the reflector about the light source.

2. The rotating light beacon of claim 1, wherein the hub includes an outwardly extending flange that supports the permanent magnet in a proximal relation to the plurality of actuator coils.

3. The rotating light beacon of claim 2, wherein the reflector includes an outwardly extending tab and the hub includes a corresponding slot that receives the tab to secure the reflector to the hub.

4. The rotating light beacon of claim 2, wherein the permanent magnet has a central removed section through which the hub is inserted such that the permanent magnet is supported by the outwardly extending flange.

5. A rotating light beacon, comprising:
   a base;
   a spindle projecting upwardly from the base and stationary relative thereto, the spindle having a top portion and a bottom portion, the bottom portion having a diameter greater than a diameter of the top portion to form a peripheral shoulder therebetween, the top portion further including an opening light socket;
   a hub having a center opening of a stepped configuration including a lip resting on the peripheral shoulder of the spindle, the hub being freely rotatable about the spindle;

an annular magnet mounted on the hub for rotation therewith, the annular magnet having portions of alternating polarities spaced circumferentially about the annular magnet, the annular magnet being spaced above the base;

at least two coils mounted adjacent the annular magnet;

a drive circuit for supplying an electrical current to the coils to create a time varying magnetic field that cooperates with the annular magnet to rotate the hub; and a reflector mounted to the hub for rotation about the light socket.

* * * * *

UNITED STATES PATENT AND TRADEMARK OFFICE
CERTIFICATE OF CORRECTION

PATENT NO. : 5,517,388
DATED : May 14, 1996
INVENTOR(S) : J.T. Hutchisson

It is certified that error appears in the above-indentified patent and that said Letters Patent is hereby corrected as shown below:

COLUMN   LINE

4   49   "2" should read --1--

Signed and Sealed this

Thirty-first Day of December, 1996

Attest:

BRUCE LEHMAN

Attesting Officer    Commissioner of Patents and Trademarks